United States Patent
Tara

(10) Patent No.: US 6,409,919 B1
(45) Date of Patent: Jun. 25, 2002

(54) REUSABLE FILTER HOUSING WITH REPLACEABLE, DISPOSABLE FILTER CARTRIDGE

(75) Inventor: Stanley P. Tara, Fairport, NY (US)

(73) Assignee: North American Filter Corporation, NY (US)

(*) Notice: Subject to any disclaimer, the term of this patent is extended or adjusted under 35 U.S.C. 154(b) by 0 days.

(21) Appl. No.: 09/766,702

(22) Filed: Jan. 23, 2001

(51) Int. Cl.[7] ............................................. B01D 29/54
(52) U.S. Cl. ..................... 210/232; 210/342; 210/458; 210/484; 210/489; 210/793.2; 210/497.01
(58) Field of Search .................................. 210/232, 315, 210/323.2, 342, 450, 455, 457, 458, 484, 485, 487, 489, 493.1, 493.2, 497.01

(56) References Cited

U.S. PATENT DOCUMENTS

| | | | | |
|---|---|---|---|---|
| 2,387,368 A | * | 10/1945 | Vokes | 210/184 |
| 3,498,464 A | * | 3/1970 | Frosolone | 210/457 |
| 5,006,242 A | * | 4/1991 | Sato et al. | 210/232 |
| 5,762,788 A | * | 6/1998 | Gullett | 210/232 |

* cited by examiner

Primary Examiner—Matthew O. Savage
(74) Attorney, Agent, or Firm—Shlesinger, Fitzsimmons & Shlesinger

(57) ABSTRACT

Two perforated metal sleeves are secured in radially spaced coaxial relation one within the other between a pair of rigid end caps that are releasably secured to opposite ends of a plurality of rods which support the caps removably and sealingly over opposite ends, respectively, of the sleeves. An annular filter cartridge is releasably secured in the radial space between the sleeves with resilient annular end caps on opposite ends of the cartridge disposed in releasable, sealing engagement with the rigid end caps. Fluid that is to be filtered is delivered to the radial space separating two annular filter elements in the filter cartridge. When one or the other of the end caps is removed from the support rods the cartridge can be removed from between the sleeves and replaced without having to destroy the sleeves or the rigid end caps.

13 Claims, 2 Drawing Sheets

REUSABLE FILTER HOUSING WITH REPLACEABLE, DISPOSABLE FILTER CARTRIDGE

BACKGROUND OF THE INVENTION

This invention relates to liquid filters, and more particularly to filters of the type having removeable and replaceable filter cartridges. Even more particularly, this invention relates to an improved filter housing which contains a replaceable filter cartridge containing two pleated filter packs, and which is designed to permit reuse of the filter housing after the filter packs have been replaced.

It has long been standard practice to design fluid filter units with replaceable filter cartridges, which after prolonged use become clogged or otherwise so dirty that the flow of fluid through the cartridges becomes so reduced that continued, incoming fluid dangerously increases the pressure created in the associated filter housing. It has therefore become quite commonplace to remove the filter elements or cartridges from a filter housing either to replace or to clean the elements for reuse. This presupposes, of course, that the interior of the filter housing is readily accessible to permit replacement of the filter cartridge or cartridges therein. For example, U.S. Pat. Nos. 2,654,483, 1,624,832 and 3,487,940 disclose filter units having replaceable filter elements and associated filter housings which can be used repeatedly upon the replacement of the associated filter elements therein. However, a major disadvantage of several filter units of the type described is that many such filter cartridges, such as disclosed for example in U.S. Pat. Nos. 5,180,489 and 5,811,002, are of the disposable type, which, when they become clogged and inoperative, are replaced by a new, similar cartridge, and the old cartridge is discarded, including, very often the entire cartridge housing and its contents.

It is an object of this invention, therefore, to provide an improved filter of the type which is designed so that the filter elements within the housing of an associated filter cartridge can be readily replaced, without requiring disposal of the housing of the cartridge itself, thereby considerably reducing the replacement costs of cartridges of the type that otherwise require disposal of the entire cartridge housing and its contents.

Still another object of this invention is to provide an improved filter unit of the type described having two pleated filter packs forming a replaceable filter cartridge enclosed in a perforated metal jacket which can be repeatedly employed after the filter packs have been replaced.

Another object of this invention is to employ an improved filter unit of the type described in which the replaceable filter elements thereof can be readily crushed and considerably reduced in size or alternatively can be incinerated.

Still other objects of this invention will be apparent hereinafter from the specification and from the recital of the appended claims, particularly when read in conjunction with the accompanying drawings.

SUMMARY OF THE INVENTION

The filter unit includes a pair of metallic, tubular filter elements each of which has therethrough intermediate its ends numerous closely spaced circular openings. Although these perforated elements are equal in length, one is larger in diameter than the other and is referred to as the housing, while the other is denoted as the core.

In use the two perforated elements are releasably secured at opposite ends thereof, and in radially spaced coaxial relation to each other, in registering, annular recesses formed in the confronting surface of a pair of rigid end plates that are secured releasably over opposite ends of the elements by a plurality of steel support rods. Removably mounted in the annular space between the outer element or housing and the inner element or core, is a replaceable filter cartridge comprising a pair of radially spaced, pleated filter elements opposite ends of which are secured or potted in a pair of plastic end caps which are removably positioned between the housing and core with the outer surfaces thereof releasably and snugly engaging the inner surfaces of the end plates.

THE DRAWINGS

DETAILED DESCRIPTION OF THE PREFERRED EMBODIMENTS

Figure 2:
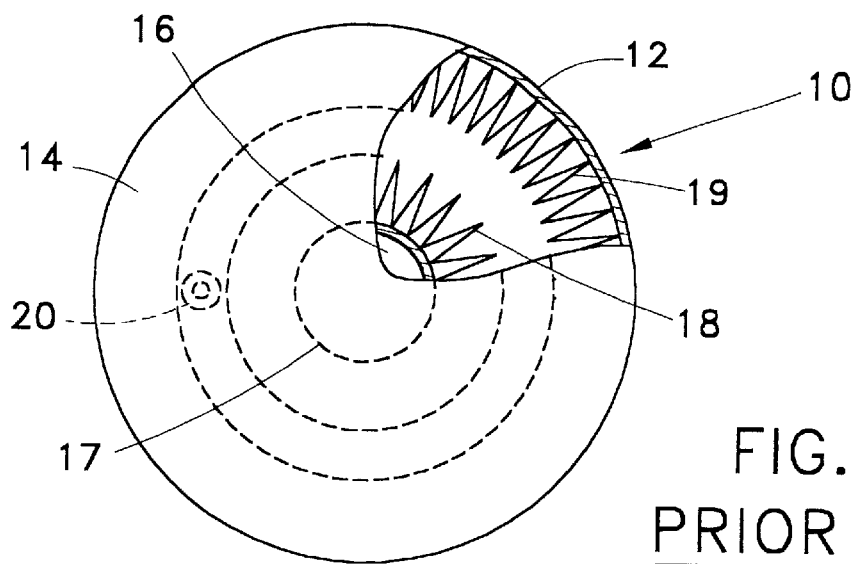
FIG. 2 is a plan view of the cartridge shown in FIG. 1, portion of the top cap of the cartridge being broken away and shown in section for purposes of illustration.
Figure 1:
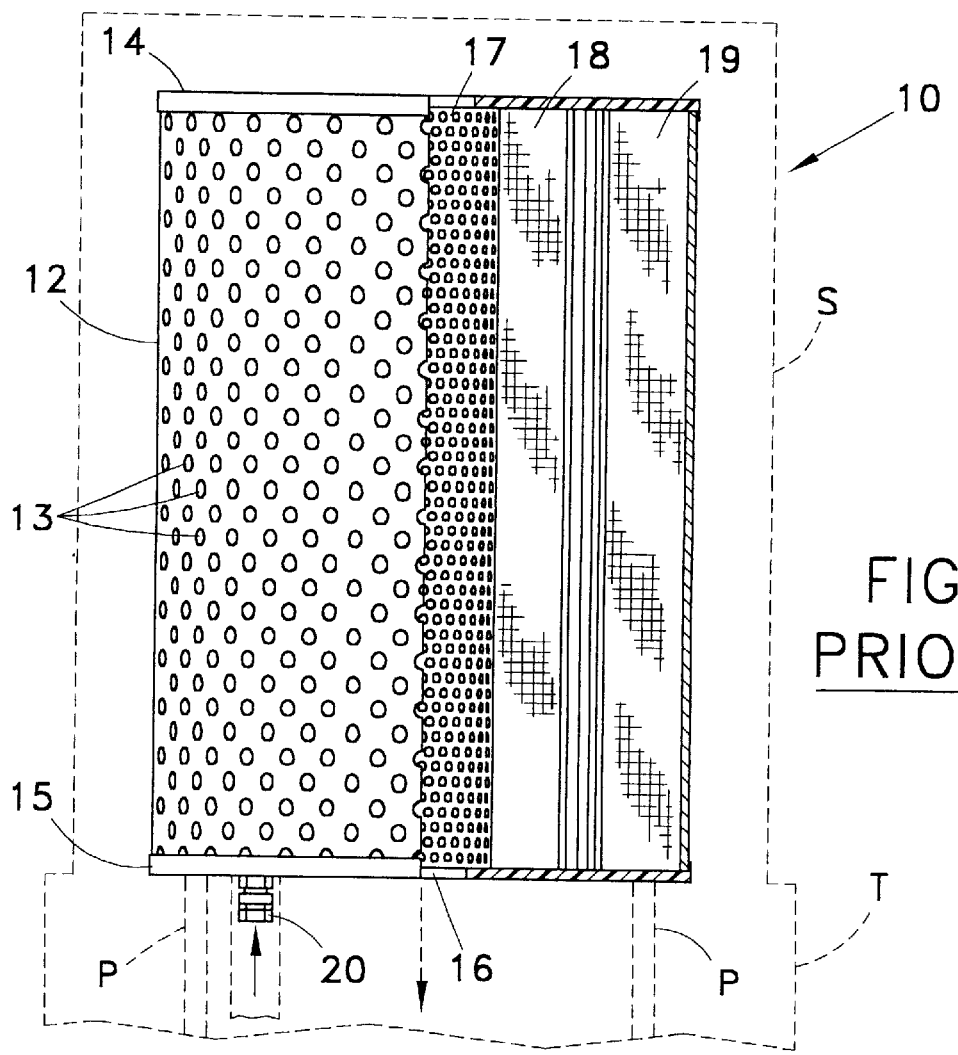
FIG. 1 is an elevational view, partly in section, of a disposable filter cartridge of the type heretofore employed in certain filter apparatus, portions of which are shown fragmentarily and in phantom by broken lines.

Referring now to the drawings by numerals of reference, and first to FIGS. 1 and 2, 10 denotes generally a conventional or well known filter cartridge comprising an outer, tubular, metal housing 12 having therethrough numerous small circular openings or apertures 13. Secured sealingly over opposite ends of housing 12 coaxially thereof are top and bottom end caps or plates 14 and 15, respectively, which can be made of metal or plastic. The bottom plate 15 has therethrough and coxially thereof, a small circular opening or outlet 16, which registers coaxially with the lower end of a reduced-diameter perforated metal core 17, which is sealingly secured at opposite ends thereof in the end plates 14 and 15 coaxially thereof The core 17 is substantially smaller in diameter than the housing 12, thereby leaving between the housing and the core a rather large radial space.

Secured at opposite ends thereof in the end caps 14 and 15, and extending coaxially through the radial space between housing 12 and core 17 are two, radially spaced, pleated filter elements or packs 18 and 19. The annular filter pack 18 surrounds and is closely positioned around the outside of the core 17, while the pack or pleated element 19 has its inner surface radially spaced from element 18 and has its outer surface disposed in closely spaced relation to the inside of the housing wall 12. Secured in an opening in the bottom plate 15 which communicates with the radial space between the packs 18 and 19 is a tubular fitting 20 which is employed for feeding into the space between packs 18 and 19 the fluid that is to be filtered.

In a typical installation cartridge 10 is removably supported at its lower end by a plurality of posts P in the upper, open end of a tank T, and within an annular shroud S. Incoming fluid supplied by fitting 20 passes in part through the inner filter pack 18 to the bore in the core 17 and out of the opening 16 to the tank T, while other of the incoming fluid passes outwardly through the pack 19 and the openings 13 in housing 12 also to the tank T.

One of the major disadvantages, however, of a cartridge of the type denoted by numeral 10 is the fact that when the filter elements or packs 18 and 19 become clogged or excessively dirty, the pressure inside of the cartridge 10 increases substantially, and also the filter elements 18 and 19 become essentially useless. At such stage, disposal is made of the entire filter cartridge 10, which in turn is replaced by a similar cartridge. As a consequence the housing 10 and its associated components are employed only once, and upon disposal generally end up in a nearby landfill, or the like.

Referring now to FIGS. 3 to 5, 30 denotes generally an improved filter unit comprising a perforated metal housing 32 of tubular configuration, which like the housing 12 in FIG. 1 has therethrough a plurality of closely spaced circular openings or perforations 33. Opposite ends of tubular housing 32 are releasably seated coaxially in a pair of annular recesses 34 and 35 which are formed on the confronting surfaces of a pair of top and bottom sealing plates denoted by the numerals 36 and 37, respectively. Plates 36 and 37 are releasably secured over opposite ends of housing 32 by a plurality (four in the embodiment illustrated) of stainless steel support rods 39 having on opposite ends thereof externally threaded sections that project into arcuate recesses 40 and 41, formed respectively in the outer surfaces of plates 36 and 37 at ninety degree intervals thereabout. Nuts 42 which are releasably secured to opposite ends of the rods 39 function to retain the plates 36 and 37 snugly and releasably over opposite ends of housing 32.

Mounted coaxially within housing 32 in radially spaced relation thereto, is a reduced-diameter, perforated metal core 44, which like the core shown in FIG. 1, has therethrough a plurality of small circular openings or apertures. In the illustrated embodiment, core 44 has an axial length approximately equal to that of the surrounding housing 32, and has opposite ends thereof seated snugly in registering annular recesses 45 and 46 (FIG. 4) formed coaxially in the confronting surfaces of the sealing plates 36 and 37, respectively. Opposite ends of the core 44 may be releasably seated in the recesses 45 and 46, or, as noted hereinafter, optionally at least one end of the core may be secured to one of the plates, for example the bottom plate 37.

Figure 3:
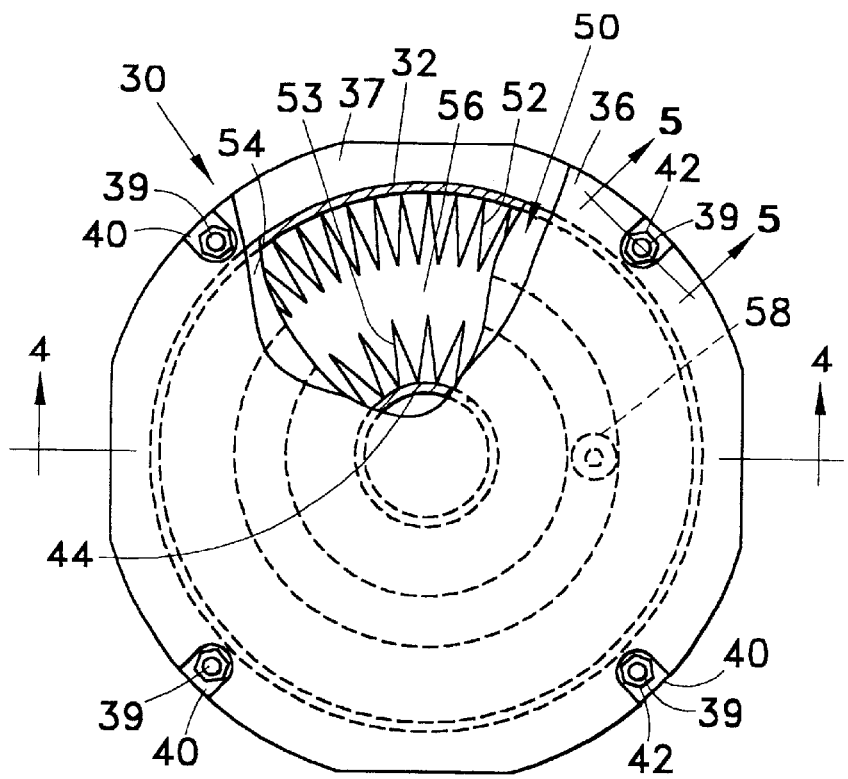
FIG. 3 is a plan view of an improved filter unit made according to one embodiment of this invention, portions of the top sealing plate and the top of the cartridge being broken away in part to illustrate better the interior of the cartridge.
Figure 5:
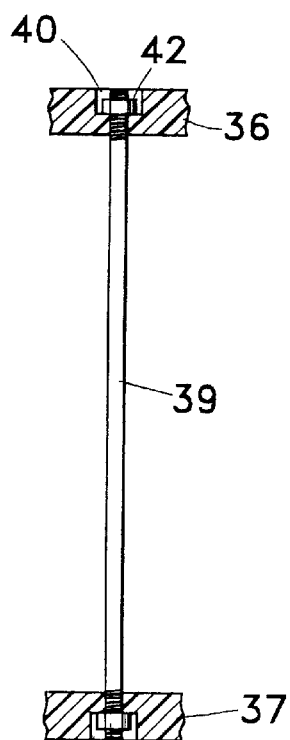
FIG. 5 is a fragmentary sectional view taken generally along the line 5—5 in FIG. 4 looking in the direction of the arrows.
Figure 4:
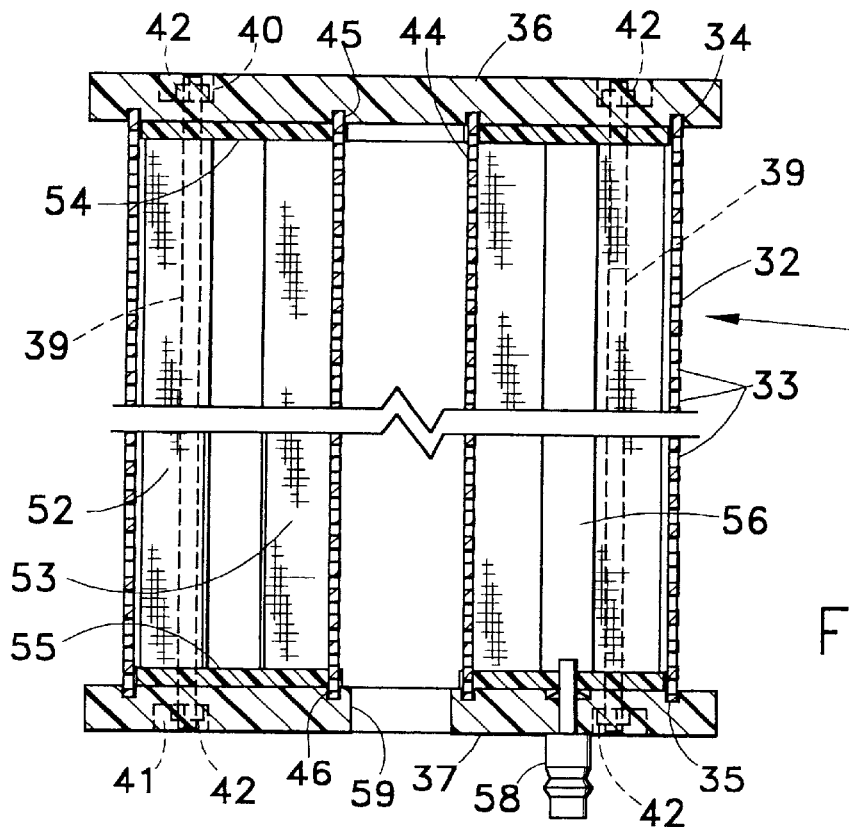
FIG. 4 is a sectional view taken generally along the line 4—4 in FIG. 3 looking in the direction of the arrow with the fluid inlet in the bottom of the cartridge being shown in full rather than in section.

Releasably mounted in the housing 32 between the sealing plates 36 and 37 is a circular filter cartridge which in FIG. 3 is denoted generally by the numeral 50. Cartridge 50 comprises two, radially spaced, pleated filter elements or packs 52 and 53, each of which is annular in configuration. Opposite ends of the pleated filter packs 52 and 53 are secured or potted into a pair of flexible, plastic end caps 54 and 55, which are removably mounted in housing 32 with the outer surfaces thereof releasably and sealingly engaged with the underside or inside surfaces of the sealing plates 36 and 37, respectively. The end caps 54 and 55 maintain the radially inner pack 53 releasably and snugly around the inner core 44, while the outer pack 52 is maintained at its outer surfaces in confronting relation to the inner peripheral surface of the perforated housing 32.

In use, liquid fluid that is to be filtered, is injected into the radial space 56 between the filter elements 52 and 53 by a tubular fitting 58 which is secured intermediate its ends in the bottom sealing plate 37 with its inner end opening on the space 56 between the filter elements 52 and 53, and with its outer end disposed to be connected to the supply of fluid that is to be filtered. As in the case of the embodiment shown in FIGS. 1 and 2, the liquid entering cartridge 50 through element 58 is free to pass radially inwardly through the inner filter element 53 and through the perforations in the core 44 to the bore of core 44, after which it passes downwardly through the axial bore in the annular end cap 55, and the registering, central opening 59 in the bottom sealing plate 37 to a retainer for filtered fluid (not illustrated). Fluid entering the space 56 also may be filtered by passing radially outwardly through the outer filter element 52 the apertures in the housing 32 for delivery by means (not illustrated) to the container for filtered fluid.

After prolonged use of the unit 10, the packs 52 and 53 in the cartridge 50 begin to accumulate matter which significantly reduces their ability to permit liquid to pass therethrough during the filtering process, and as a consequence as fluid continues to be fed into cartridge 50 via the element 58, the pressure in the cartridge, and particularly in the space 56, begins to increase rather substantially. But for the presence of the rigid sealing plates 36 and 37, the increased pressure could result in failure of one or both of the end caps 54 and 55, and therefore could result in undesirable leakage of the fluid that is to be filtered. Because of the presence of the plates 36 and 37 and the associated support rods 39, the cartridge 50 will never fail in that manner. Instead, whenever it appears that the flow of filtered fluid from the filter unit has diminished to a certain point, the flow of fluid through the inlet 58 can be terminated, and access to the cartridge 50 can be readily achieved merely by removing one or the other of the end plates upon removal of the associated nuts 42.

For example, upon removal of the top plate 36, the cartridge 50 which is removably mounted between the housing 32 and core 44 can be readily removed and replaced by a new cartridge 50. The inner end of the inlet element 58 is snugly but releasably mounted in the opening of the end cap 55 through which it projects into the space 56, so that the end cap 55 of a respective cartridge 50, can be readily inserted or removed from the inner end of that element. Also, of course, if desired the reduced-diameter shank of the element 58, which extends through both plate 37 and the end cap 55 can be releasably and snugly inserted through registering openings in the plate 37 and end cap 55, if desired. After a new cartridge 50 has been inserted into the housing 32 the top plate 36 once again can be secured snugly against the end cap 54 of the new cartridge, in such manner that the end cap 55 of the cartridge is also secured snugly and removably against the bottom plate 37. Thus, the perforated housing 32 and the associated perforated core 44 can be repeatedly used over and over in connection with new cartridges 50. The disposed cartridges 50, on the other hand, can also be readily compacted or incinerated.

From the foregoing it will be apparent that the present invention provides relatively simple but a substantially more inexpensive filter unit with a replaceable cartridge, as compared to prior such devices of the type in which disposal of the cartridge included disposal also of the perforated, outer metal housing, and in many instances also of the associated inner perforated core. By simply replacing the cartridge 50 and its two pleated filter elements 52 and 53, the overall cost of operation of the unit 10 is considerably reduced as compared to prior such devices. Still another advantage of unit 10 is the fact that the removable cartridge 50, as well as its housing 32 and inner core 44 are secured snugly between the plates 36 and 37 by the support rods 39, thereby preventing any accidental erruption or failure of the end caps 54 and 55 of the associated cartridge.

Moreover, while this invention has been illustrated and described in detail in connection with only certain embodiments thereof, it will be apparent to one skilled in the art that slight changes can be made without departing from this invention. For example, as noted above, the inner core 44 can be, if desired, secured in the recess 46 in the bottom plate 37, and may be releasably seated at its upper, opposite end in the registering recess 45 in the top plate 36, so that, for example, upon removal of the top plate 36, the inner core 44 will remain secured to the bottom plate 37 upon removal and replacement of the cartridge 50. Alternatively, of course, if desired, the lower end of the inner core 44 could also be removably mounted in the recess 46 in the bottom plate 37, in which case it could also be removed, if desired, to permit cleaning thereof before insertion with, for example, a new cartridge 50. Also, while this invention is obviously capable of still further modification, it is intended that this application cover any such modifications as may fall within the scope of one skilled in the art, or the appended claims.

What is claimed is:

1. A fluid filter cartridge assembly, comprising
    a pair of metal sleeves each having therethrough intermediate its ends a plurality of straining apertures, and one of said sleeves being smaller in diameter than the other,
    a pair of end caps each having formed in one surface thereof a pair of radially spaced annular recesses disposed coaxially one within the other, and one of which end caps has therethrough an opening for discharging filtered fluids,
    said sleeves being releasably secured in radially spaced coaxial relation to each other between said end caps, and with opposite ends of said one sleeve being seated releasably and sealingly in said one recesses in said end caps, and with opposite ends of said other sleeve being releasably and sealingly seated in said other recesses in said end caps, and
    an annular filter cartridge removably mounted coaxially in the radial space between said sleeves and having opposite ends thereof releasably and sealingly engaged with said end caps,
    said cartridge comprising a pair of radially spaced, pleated filter elements disposed to have fed to the radial space therebetween the fluid that is to be filtered.

2. A fluid filter cartridge assembly as defined in claim 1, wherein
    said end caps are made of rigid material, and
    said pleated filter elements are secured at opposite ends thereof coaxially in a pair of annular end caps made of a flexible material.

3. A fluid filter cartridge assembly as defined in claim 1, including means extending between and releasably securing said end caps over opposite ends of said sleeves and said cartridge.

4. A fluid filter cartridge assembly as defined in claim 3, wherein said means comprises
    a plurality of rigid rods extending between said end caps, and
    means for releasably securing said rods adjacent opposite ends thereof to said end caps.

5. A fluid filter cartridge assembly as defined in claim 1, wherein said opening in said one end cap registers coaxially with one end of said one sleeve.

6. A fluid filter cartridge assembly as defined in claim 5, wherein a tubular fitting is secured intermediate its ends in said one end cap to open at one end on the radial space between said filter elements, and disposed to be connected at its opposite end to a supply of fluid that is to be filtered.

7. A fluid filter cartridge assembly as defined in claim 6, wherein said one end of said fitting extends slidably through one end of said cartridge to communicate with said radial space between said filter elements.

8. A fluid filter cartridge assembly, comprising
    a pair of metal sleeves each having therethrough intermediate its ends a plurality of spaced straining apertures, and one of said sleeves being smaller in diameter than the other,
    a pair of rigid end caps each having formed in one surface thereof a pair of radially spaced circular recesses disposed coaxially one within the other,
    means releasably securing said end caps to each other over opposite ends, respectively, of said sleeves to maintain said sleeves in radially spaced coaxial relation to each other between said end caps, and with opposite ends of said one sleeve being seated sealingly in said one recesses in said end caps, and with opposite ends of said other sleeve being seated sealingly in said other recesses in said end caps, and
    an annular filter cartridge removably mounted coaxially in the radial space between said sleeves and having opposite ends thereof releasably and sealingly engaged with said end caps,
    said cartridge containing a pair of radially spaced coaxially disposed filter elements disposed to have fed into the radial space therebetween the fluid that is to be filtered.

9. A fluid filter cartridge assembly as defined in claim 8, wherein said opposite ends of said sleeves are releasably seated in said circular recesses in said end caps.

10. A fluid filter cartridge assembly as defined in claim 8, wherein one end of said one sleeve is secured in said one recess in one of said end caps.

11. A fluid filter cartridge assembly as defined in claim 8, wherein at least one of said pair of filter elements is a pleated filter element.

12. A fluid filter cartridge assembly as defined in claim 8, wherein said opposite ends of said cartridge comprise flexible annular end caps in which opposite ends of said filter elements are embedded.

13. A fluid filter cartridge assembly as defined in claim 12, including
    a tubular fitting secured intermediate its ends in one of said rigid end caps and having an outer end disposed to be connected to a supply of fluid that is to be filtered, and an inner end extending slidably through one of said flexible end caps of said cartridge to communicate with the radial space between said filter elements, and
    said one rigid end cap having therethrough an opening registering coaxially with said one sleeve to allow the discharge of filtered fluid from said cartridge.

* * * * *